(12) United States Patent
Tahara

(10) Patent No.: US 10,720,874 B2
(45) Date of Patent: Jul. 21, 2020

(54) BRUSHLESS DC MOTOR

(71) Applicant: Panasonic Intellectual Property Management Co., Ltd., Osaka (JP)

(72) Inventor: Takayuki Tahara, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 20 days.

(21) Appl. No.: 16/309,338

(22) PCT Filed: Jul. 13, 2017

(86) PCT No.: PCT/JP2017/025513
§ 371 (c)(1),
(2) Date: Dec. 12, 2018

(87) PCT Pub. No.: WO2018/021043
PCT Pub. Date: Feb. 1, 2018

(65) Prior Publication Data
US 2019/0131913 A1    May 2, 2019

(30) Foreign Application Priority Data
Jul. 27, 2016 (JP) ................................ 2016-146978

(51) Int. Cl.
*H02P 29/68* (2016.01)
*H02P 29/64* (2016.01)
(Continued)

(52) U.S. Cl.
CPC .......... *H02P 29/64* (2016.02); *F04D 25/0606* (2013.01); *F04D 27/004* (2013.01);
(Continued)

(58) Field of Classification Search
CPC ........... H02P 6/182; H02P 6/16; H02K 1/187; H02K 15/03; H02K 3/47
See application file for complete search history.

(56) References Cited

U.S. PATENT DOCUMENTS

| 4,837,492 A | * | 6/1989 | Kurosawa | G01D 5/244 318/661 |
| 5,083,052 A | * | 1/1992 | Ochi | H02K 1/187 29/598 |

(Continued)

FOREIGN PATENT DOCUMENTS

| JP | H10-201280 A | 7/1998 |
| JP | 2001-169589 A | 6/2001 |

(Continued)

OTHER PUBLICATIONS

International Search Report for corresponding App. No. PCT/JP2017/025513, dated Sep. 12, 2017.

*Primary Examiner* — Rina I Duda
(74) *Attorney, Agent, or Firm* — Renner, Otto, Boisselle & Sklar, LLP

(57) ABSTRACT

Provided is a brushless DC motor (2) including: a stator (5) around which windings are around; a magnet rotor (6) configured to rotate by a power supply to the stator; an inverter circuit (11) connected to the stator; a position detector (7) configured to detect a positional relationship between the magnet rotor and the windings; a speed instruction unit (13) configured to output, as a speed instruction signal, a voltage corresponding to a rotation speed of the magnet rotor; a duty determination unit (12) configured to determine a duty of a voltage applied to the stator, based on the speed instruction signal; a drive controller (14) configured to distribute and output a duty signal based on the positional relationship and the duty; and temperature-sensitive resistance elements (15) configured to, by increasing the (Continued)

resistance in response to a temperature rise, reduce the voltage given as the speed instruction signal.

7 Claims, 10 Drawing Sheets

(51) Int. Cl.
    *H02P 6/06*     (2006.01)
    *F04D 27/00*     (2006.01)
    *H02K 11/25*     (2016.01)
    *H02P 6/15*     (2016.01)
    *F04D 25/06*     (2006.01)
    *H02P 6/08*     (2016.01)
    *F04D 17/08*     (2006.01)

(52) U.S. Cl.
    CPC ........... *F04D 27/008* (2013.01); *H02K 11/25* (2016.01); *H02P 6/06* (2013.01); *H02P 6/085* (2013.01); *H02P 6/15* (2016.02); *H02P 29/68* (2016.02); *F04D 17/08* (2013.01); *F05D 2270/3032* (2013.01)

(56) References Cited

U.S. PATENT DOCUMENTS

| | | | | |
|---|---|---|---|---|
| 6,531,796 | B1 * | 3/2003 | Konno | H02K 3/522 |
| | | | | 310/254.1 |
| 7,834,567 | B2 * | 11/2010 | Naya | H02P 6/16 |
| | | | | 318/34 |
| 7,982,420 | B2 * | 7/2011 | Kakimoto | H02P 6/16 |
| | | | | 318/400.13 |
| 2006/0082339 | A1 * | 4/2006 | Hamaoka | F04B 35/04 |
| | | | | 318/400.21 |
| 2010/0281897 | A1 * | 11/2010 | Ikeda | F24F 11/62 |
| | | | | 62/186 |
| 2013/0002178 | A1 * | 1/2013 | Endou | H02P 6/182 |
| | | | | 318/400.11 |

FOREIGN PATENT DOCUMENTS

JP      2003-322182 A      11/2003
JP      2017/025513 A      9/2017

* cited by examiner

| Condition | Hole element | | | Winding U | | Winding V | | Winding W | |
|---|---|---|---|---|---|---|---|---|---|
| | Hu | Hv | Hw | Upper arm Q1 | Lower arm Q4 | Upper arm Q2 | Lower arm Q5 | Upper arm Q3 | Lower arm Q6 |
| 1 | H | L | H | OFF | PWM | ON | OFF | OFF | OFF |
| 2 | H | L | L | OFF | PWM | OFF | OFF | ON | OFF |
| 3 | H | H | L | OFF | OFF | OFF | PWM | ON | OFF |
| 4 | L | H | L | ON | OFF | OFF | PWM | OFF | OFF |
| 5 | L | H | H | ON | OFF | OFF | OFF | OFF | PWM |
| 6 | L | L | H | OFF | OFF | ON | OFF | OFF | PWM |

PRIOR ART

BRUSHLESS DC MOTOR

TECHNICAL FIELD

The present disclosure relates to a brushless direct-current (DC) motor.

BACKGROUND ART

In recent years, brushless DC motors have been increasingly installed in ventilating air blowers, such as a ventilation fan, a range hood fan, and an air cleaner because brushless DC motors offer great efficiency, lower power consumption, and excellence in durability. In such brushless DC motors, when an abnormality such as locking or overloading occurs, the temperature of a winding abnormally rises, and accordingly, insulation breakdown or poor insulation occurs in the winding, and, at the worst, there is a possibility that the motors ignite. Therefore, brushless DC motors have the function of, when an abnormality occurs, detecting the abnormality and substantially preventing a rise in the temperature of a winding or other components.

As an example of such type of conventional brushless DC motors, a brushless DC motor illustrated in FIG. 9 and FIG. 10 has been known.

Hereinafter, the configuration of the brushless DC motor will be described with reference to FIG. 9 and FIG. 10.

FIG. 9 is a block diagram illustrating a function of a conventional brushless DC motor. As illustrated in FIG. 9, windings U, V, and W of brushless DC motor 101 are connected to a plurality of switching elements 102 configured to transmit driving signals Vu, Vv, and Vw to windings U, V, and D, respectively. Each of switching elements 102 is provided with transistors Q1, Q2, Q3, Q4, Q5, and Q6. Each of transistors Q1 to Q6 is connected in parallel to a diode. Driving signal Vu for winding U is outputted from a connection point between transistor Q1 and transistor Q4; driving signal Vv for winding V is outputted from a connection point between transistor Q2 and transistor Q5; and driving signal Vw for winding W is outputted from a connection point between transistor Q3 and transistor Q6.

Collectors of transistors Q1 to Q3 are connected to an anode of DC power supply 103. Emitters of transistors Q4 to Q6 are connected to a cathode of DC power supply 103.

Position detector 104 is connected to switching element ON/OFF signal generating unit 105. Switching element ON/OFF signal generating unit 105 is connected to driving unit 106 configured to output a control signal for turning on/off each of transistors Q1 to Q6 of switching element 102. A signal outputted from switching element ON/OFF signal generating unit 105 is inputted into driving unit 106.

Furthermore, switching element ON/OFF signal generating unit 105 is connected to speed instruction unit 107 and overcurrent detector 108.

Using a comparator, speed instruction unit 107 compares number-of-revolution command signal 109 for determining the number of revolutions of brushless DC motor 101 with a triangular wave from a triangular wave generating circuit. Then, speed instruction unit 107 outputs, to switching element ON/OFF signal generating unit 105, a duty for an on-time of transistors Q1 to Q6 according to a predetermined rotation speed, thereby driving brushless DC motor 101. A motor current flows through current detection resistor 110, the motor current having the same magnitude as the magnitude of current flowing through windings U, V, and W of brushless DC motor 101 via switching elements 102.

FIG. 10 is a block diagram of overcurrent detector 108.

Using comparator 112, overcurrent detector 108 compares a voltage generated when a motor current having flown through each of windings U, V, and W flows through current detection resistor 110 with reference voltage 111. When the voltage generated in current detection resistor 110 is larger than Vref, that is, reference voltage 111, comparator 112 outputs a signal for turning off transistors Q1 to Q6 to switching element ON/OFF signal generating unit 105. When receiving the signal inputted from comparator 112, switching element ON/OFF signal generating unit 105 turns off transistors Q1 to Q6 via driving unit 106.

Temperature-sensitive resistance element 113 whose a resistance value increases in response to a temperature rise, common power supply 114 for a drive circuit, and partial-pressure resistance 115 having a resistance value R1 sufficiently larger than that of the temperature-sensitive resistance element at a normal temperature are connected between current detection resistor 110 and comparator 112. Then, voltage V0 to be inputted to comparator 112 is obtained by adding, to a voltage generated in current limiting resistance 110, voltage $V0=E*Rt/(Rt+R1)$, where E is a voltage of common power supply 114, and Rt is a resistance value of temperature-sensitive resistance element 113 at a certain temperature. That is, by increasing the number of signals for turning off transistors Q1 to Q6, switching element ON/OFF signal generating unit 105 reduces current flowing through brushless DC motor 101, thereby substantially preventing a rise in the temperatures of windings U, V, and W.

CITATION LIST

Patent Literature 1: Japanese Unexamined Patent Application Publication No. H10-201280

SUMMARY OF INVENTION

In this conventional configuration, a rise in the temperature of the motor is substantially prevented by determining a temperature by using a component, such as a semiconductor, in addition to the temperature-sensitive resistance element. Hence, such configuration has problems that an increase in the number of circuit components causes lower reliability and hinders the achievement of cost reduction and downsizing.

Then, the present disclosure solves the conventional problems, and an object of the present disclosure is to provide a brushless DC motor that has higher reliability and achieves cost reduction and downsizing without a special temperature determination unit.

In order to attain this object, the brushless DC motor according to the present disclosure includes: a stator around which three-phase windings are wound; a magnet rotor configured to rotate by a power supply to the stator; an inverter circuit including a plurality of switching elements and connected to the stator; a position detector configured to detect a positional relationship between the magnet rotor and the windings; a speed instruction unit configured to output, as a speed instruction signal, a voltage corresponding to a rotation speed of the magnet rotor; a duty determination unit configured to determine a duty of a voltage applied to the stator, based on the speed instruction signal from the speed instruction unit; a drive controller configured to distribute and output a duty signal to the plurality of switching elements of the inverter circuit, based on the positional relationship detected by the position detector and the duty determined by the duty determination unit; and temperature-sensitive resistance elements configured to, by increasing a resistance in response to a temperature rise, reduce the voltage given as the speed instruction signal from the speed instruction unit to the duty determination unit.

According to the present disclosure, a brushless DC motor having higher reliability and capable of achieving cost reduction and downsizing without a special temperature determining unit can be provided.

DESCRIPTION OF EMBODIMENTS

Figure 1A:
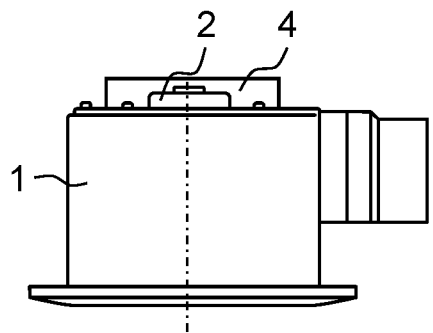
FIG. 1A is a side view of a ventilating air blower equipped with the brushless DC motor according to the present disclosure.

A brushless DC motor according to the present disclosure includes a stator around which three-phase windings are wound; a magnet rotor configured to rotate by a power supply to the stator; an inverter circuit including a plurality of switching elements and connected to the stator; a position detector configured to detect a positional relationship between the magnet rotor and the windings; a speed instruction unit configured to output, as a speed instruction signal, a voltage corresponding to a rotation speed of the magnet rotor; a duty determination unit configured to determine a duty of a voltage applied to the stator, based on the speed instruction signal from the speed instruction unit; a drive controller configured to distribute and output a duty signal to the plurality of switching elements of the inverter circuit, based on the positional relationship detected by the position detector and the duty determined by the duty determination unit; and temperature-sensitive resistance elements configured to, by increasing a resistance in response to a temperature rise, reduce the voltage given as the speed instruction signal from the speed instruction unit to the duty determination unit.

Thus, when an abnormality occurs, the temperature-sensitive resistance elements detect a rise in the temperatures of the windings and increase a resistance value, thereby reducing the voltage as the speed instruction signal to reduce the duty of the voltage applied to the stator windings. Thus, a rise in the temperatures of the stator windings can be substantially prevented without a special temperature determination unit such as a semiconductor component. Thus, the effect of achieving the brushless DC motor having higher reliability and capable of achieving cost reduction and downsizing is brought about.

Furthermore, the brushless DC motor is configured such that each of the temperature-sensitive resistance elements is provided for a corresponding one of different two of the three-phase windings, and the temperature-sensitive resistance elements are connected in series to each other on a wire connection between the speed instruction unit and the duty determination unit.

Thus, each of the temperature-sensitive resistance elements is provided for a corresponding one of different two of the three-phase windings. Therefore, when an abnormality occurs, the temperature-sensitive resistance element corresponding to at least one phase winding detects a rise in the temperature of the winding and increases a resistance value to reduce the duty of the voltage applied to the stator winding. Thus, a rise in the temperature of the stator winding can be substantially prevented, and accordingly the reliability is further enhanced.

Furthermore, the brushless DC motor is configured such that the temperature-sensitive resistance elements perform the function of reducing the duty determined by the duty determination unit in response to a rise in the temperatures of the windings in the event of an abnormality, and by increasing the resistance of at least one of the temperature-sensitive resistance elements in response to the rise in temperature in the event of the abnormality, the duty determined by the duty determination unit is reduced so as to make the range of the rise in the temperature of the windings in the event of an abnormality equal to or lower than a predetermined tolerable temperature range. Note that the term "the event of an abnormality" used herein means, for example, the event of locking of or overloading on the brushless DC motor.

Thus, in response to a rise in the temperature of a winding in the event of an rotational abnormality such as locking, a duty determined by a decrease in a voltage serving as a speed instruction signal, the decrease being caused by an increase in the resistance of one temperature-sensitive resistance element, can be set at an appropriate value, and the rise in the temperature of the winding can be controlled to be within a predetermined tolerable temperature range or lower. Thus, the brushless DC motor having further enhanced reliability can be achieved.

Furthermore, the brushless DC motor is configured such that the temperature-sensitive resistance elements are provided on a surface of the printed circuit board provided so as to face the stator, the surface facing the stator.

Each of the temperature-sensitive resistance elements thus faces a corresponding one of the different stator windings, and therefore can detect the temperatures of the windings more precisely, and consequently, the reliability can be further enhanced.

The brushless DC motor according to the present disclosure further includes resin in contact with the windings and the temperature-sensitive resistance elements.

The stator windings and the temperature-sensitive resistance elements are thus connected to each other via resin, which has heat conductivity higher than that of air, whereby the temperatures of the stator windings can be detected more precisely, and consequently, reliability can be further enhanced.

Hereinafter, an embodiment of the present disclosure will be described with reference to the drawings. Note that the following embodiment is merely a specific example of the present disclosure, and does not limit the technical scope of the present disclosure. In all of the drawings, the same constituent elements will be given the same reference numerals, respectively, and the repetition of the same description thereof will be avoided. Furthermore, in the drawings, detailed descriptions of constituent elements that are not directly related to the present disclosure will be omitted.

Embodiment 1

Figure 1C:
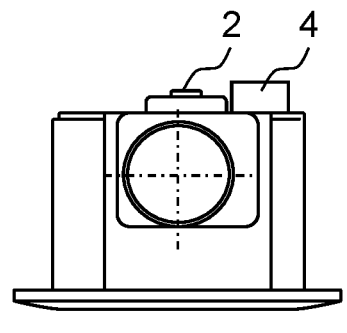
FIG. 1C is a front view of the ventilating air blower equipped with the brushless DC motor according to the present disclosure.
Figure 1B:
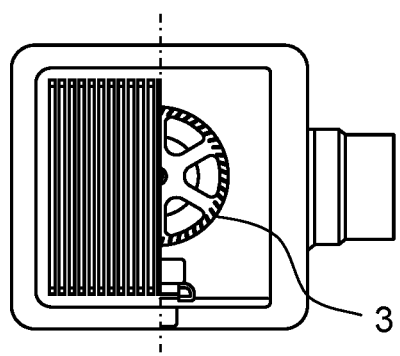
FIG. 1B is a bottom view of the ventilating air blower equipped with the brushless DC motor according to the present disclosure.

FIG. 1A is a side view of a ventilating air blower equipped with the brushless DC motor according to the present embodiment. FIG. 1B is a bottom view of the ventilating air blower equipped with the brushless DC motor according to the present embodiment. FIG. 1C is a front view of the ventilating air blower equipped with the brushless DC motor according to the present embodiment.

As illustrated in FIGS. 1A, 1B, and 1C, the ventilating air blower includes casing 1, brushless DC motor 2, air blowing fan 3, and external circuit 4. The ventilating air blower has a structure in which brushless DC motor 2 is mounted into casing 1, air blowing fan 3 is mounted into brushless DC motor 2, and external circuit 4 is mounted on the top panel of casing 1. This ventilating air blower is mounted on a ceiling, and centrifugal air blowing fan 3 is rotated based on control by external circuit 4, whereby air inside a room is inhaled and discharged to the outside to ventilate the room.

Figure 2:
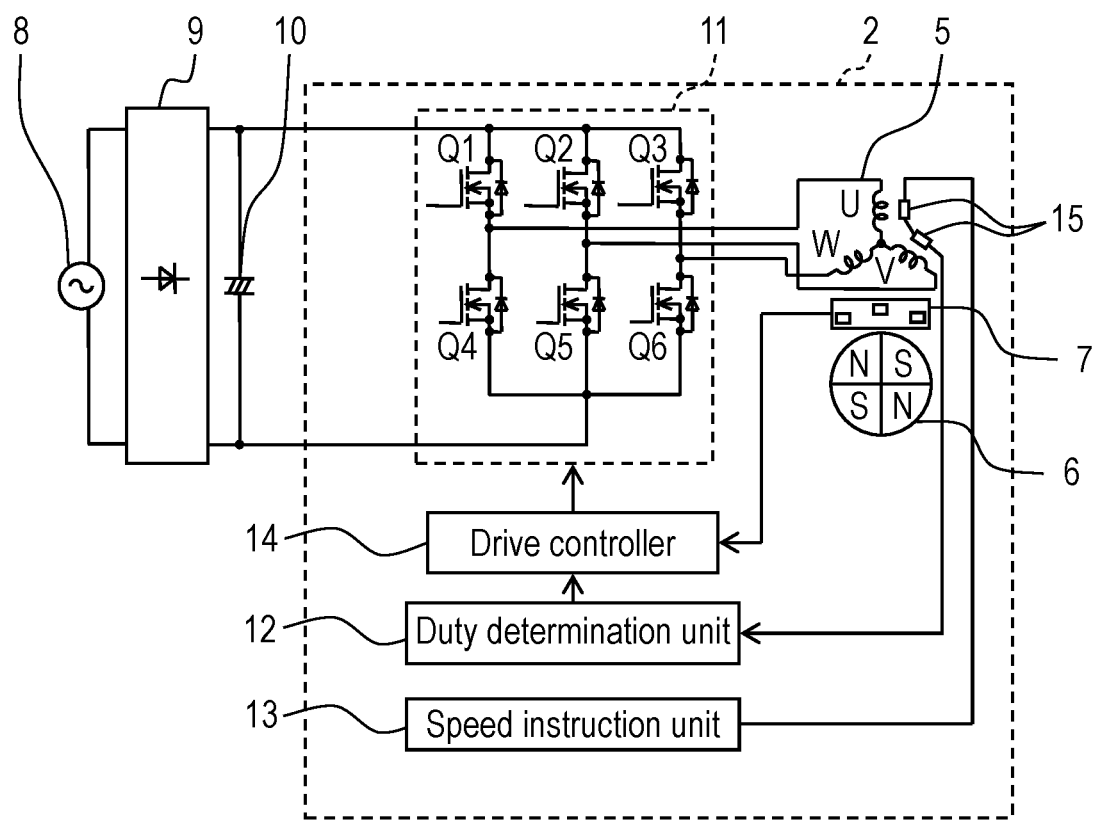
FIG. 2 is a block diagram illustrating functions of the brushless DC motor according to the present disclosure.

Next, the configuration of the brushless DC motor will be described with reference to FIG. 2. FIG. 2 is a block diagram illustrating functions of the brushless DC motor according to the present embodiment.

Brushless DC motor 2 includes stator 5, magnet rotor 6, position detector 7, inverter circuit 11, speed instruction unit 13, duty determination unit 12, drive controller 14, and temperature-sensitive resistance elements 15. Brushless DC motor 2 is connected to alternating-current (AC) power supply 8 via rectifier 9 and smoothing capacitor 10.

Stator 5 has a hollow cylindrical shape whose outer periphery is surrounded by with a plurality of tooth sections. These phase windings U, V, and W are wound around the tooth sections via a resin molded insulator. Stator 5 generates a magnetic field when the three-phase windings U, V, and W are energized.

Magnet rotor 6 is provided so that the inner periphery of stator 5 faces the outer periphery of magnet rotor 6. When coming under the influence of a magnetic field generated by stator 5, magnet rotor 6 is rotated. In other words, by supplying electric power to windings U, V, and W wound around stator 5, magnet rotor 6 is rotated.

Position detector 7 includes, for example, a hole element or a hole integrated circuit (IC). Position detector 7 detects a positional relationship between magnet rotor 6 and stator 5 by detecting switching between the N-pole and the S-pole of magnet rotor 6. In other words, position detector 7 detects a positional relationship between magnet rotor 6 and the windings U, V, and W wound around stator 5. Here, the positional relationship is expressed, for example, by an angle which, for example, a reference position of magnet rotor 6 forms with a reference position of stator 5.

AC power supply 8 is, for example, a 100-V AC power supply.

Rectifier 9 includes a full-wave rectifying diode bridge, and performs the full-wave rectification of AC power supply 8 to make conversion into a DC voltage having ripples of power supply frequency.

Smoothing capacitor 10 smooths the DC voltage resulting from the conversion by rectifier 9 to smooth the 100-V AC power supply into an approximately 140-V DC power supply. The rectified and smoothed approximately 140-V DC power supply is inputted to inverter circuit 11.

Inverter circuit 11 has a three-phase bridge structure, and switching elements Q1, Q2, and Q3 constituting a three-phase bridge constitute upper arm switching elements of windings U, V, and W, respectively. Likewise, switching elements Q4, Q5, and Q6 constitute lower arm switching elements of windings U, V, and W, respectively. As illustrated in FIG. 2, a connection point between switching element Q1 and switching element Q4 is connected to winding U; a connection point between switching element Q2 and switching element Q5 is connected to winding V; and a connection point between switching element Q3 and switching element Q6 is connected to winding W.

Speed instruction unit 13 instructs a rotation speed of magnet rotor 6. Speed instruction unit 13 determines a rotation speed of magnet rotor 6, based on a rotation speed determined, for example, by an external switch and outputs, as a speed instruction signal, a voltage corresponding to the determined rotation speed to duty determination unit 12.

Duty determination unit 12 includes a triangular-wave generating circuit (not illustrated) and a comparator (not illustrated). Duty determination unit 12 determines a duty by comparing the voltage inputted as the speed instruction signal from speed instruction unit 13 with a triangular wave by using a comparator. The determined duty is outputted to drive controller 14.

Using a position signal inputted from position detector 7, drive controller 14, produces an ON/OFF output pattern of each of switching elements Q1 to Q6 of inverter circuit 11. At the same time, the duty is inputted to drive controller 14 from duty determination unit 12. Drive controller 14 synthesizes the output pattern inputted from position detector 7 and the duty inputted from duty determination unit 12, and distributes and outputs resultant a duty signal to inverter circuit 11.

Based on the duty signal inputted from drive controller 14, inverter circuit 11 applies a PWM waveform voltage, having a peak value of approximately 140 V, of the DC power supply to windings U, V, and W of stator 5 to rotate magnet rotor 6.

Temperature-sensitive resistance elements 15 are provided on a wire connection between speed instruction unit 13 and duty determination unit 12. In the present embodiment, two temperature-sensitive resistance elements 15 are provided. Each of temperature-sensitive resistance elements 15 is provided for a corresponding one of different two of three-phase windings U, V, and W. Specifically, for example, two temperature-sensitive resistance elements 15 are provided so as to correspond to winding U and winding V of stator 5, respectively. Furthermore, two temperature-sensitive resistance elements 15 are connected in series to each other. Temperature-sensitive resistance element 15 is an element whose resistance increases in response to a temperature rise. In the present embodiment, temperature-sensitive resistance elements 15 are provided so as to correspond to windings U and V in the vicinity of windings U and V, respectively, and correspondingly respond to (detect) a rise in the temperatures of windings U and V and increase self-resistance. In other words, when the temperatures of windings U and V rise, the temperatures of temperature-sensitive resistance elements 15 also rise, and resistance values of temperature-sensitive resistance elements 15 increase. When resistance values of temperature-sensitive resistance elements 15 increase, then a voltage value to be given to duty determination unit 12 as a speed instruction signal decreases. The details will be described later. Note that the expression used herein "temperature-sensitive resistance element 15 is provided so as to correspond to winding U" means that temperature-sensitive resistance element 15 is arranged at a position at which the temperature of temperature-sensitive resistance element 15 rises mainly in response to a rise in the temperature of winding U. In the present embodiment, two temperature-sensitive resistance elements 15 are used, but, three or more temperature-sensitive resistance elements 15 may be used. For example, the use of three temperature-sensitive resistance elements 15 enables the detection of the temperatures of all windings U, V, and W. Furthermore, for example, when a plurality of temperature-sensitive resistance elements 15 is arranged at different portions of winding U, a local temperature rise can be also detected.

Figure 3:
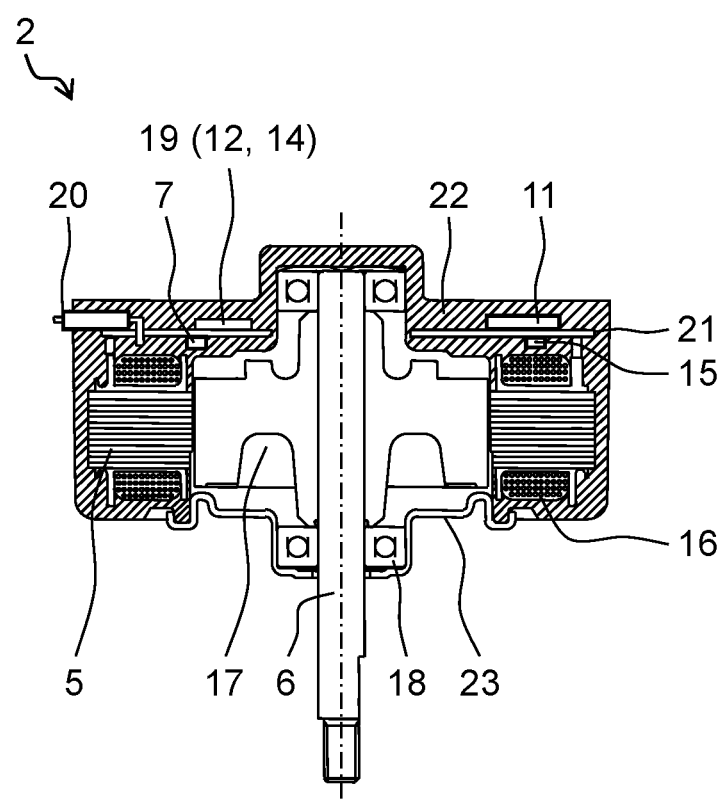
FIG. 3 is a cross-sectional view of the brushless DC motor according to the present disclosure.

FIG. 3 is a cross-sectional view of brushless DC motor 2 according to the present embodiment. As illustrated in FIG. 3, windings 16 are wound around stator 5. Magnet rotor 6 includes permanent magnet 17 and ball bearing 18. Monolithic IC 19 including duty determination unit 12 and drive controller 14, connector 20 serving as an interface with external circuit 4, inverter circuit 11, position detector 7, and temperature-sensitive resistance elements 15 are mounted on printed circuit board 21 and electrically connected to each other. Stator 5 and printed circuit board 21 are integrally molded with resin 22 and form a part of the outer frame of brushless DC motor 2. Furthermore, magnet rotor 6 is supported by bracket 23 and stator 5 integrated into the outer frame. Furthermore, temperature-sensitive resistance elements 15 are arranged in the vicinity of windings 16 of the stator, and resin 22 is filled between temperature-sensitive resistance elements 15 and windings 16. Thus, heat conductivity between temperature-sensitive resistance elements 15 and windings 16 is higher than that in the case in which nothing is filled therebetween.

Figure 4:
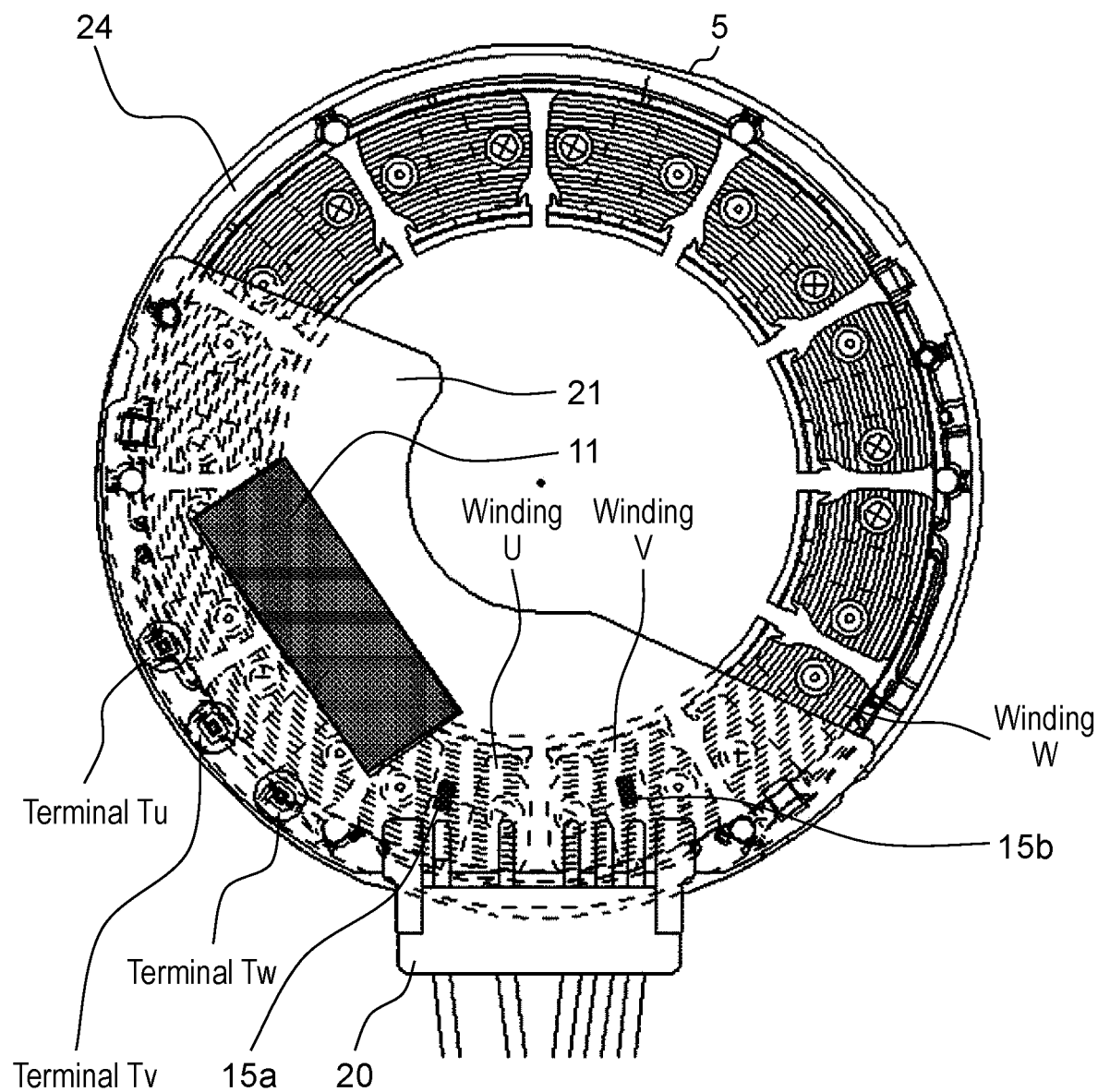
FIG. 4 illustrates an arrangement of temperature-sensitive resistance elements mounted on a printed circuit board according to the present disclosure.

FIG. 4 illustrates an arrangement of stator 5 and temperature-sensitive resistance elements 15 mounted on printed circuit board 21 according to the present embodiment. As illustrated in FIG. 4, printed circuit board 21 is fixed to insulator 24 constituting stator 5. Furthermore, windings 16, namely, windings U, V, and W are electrically connected to printed circuit board 21 via terminals Tu, Tv, and Tw.

In the present embodiment, while temperature-sensitive resistance element 15a corresponds to winding U and temperature-sensitive resistance element 15b corresponds to winding V, temperature-sensitive resistance elements 15a and 15b are provided on the back side of printed circuit board 21, that is, on a surface facing windings U and V.

Figure 5:
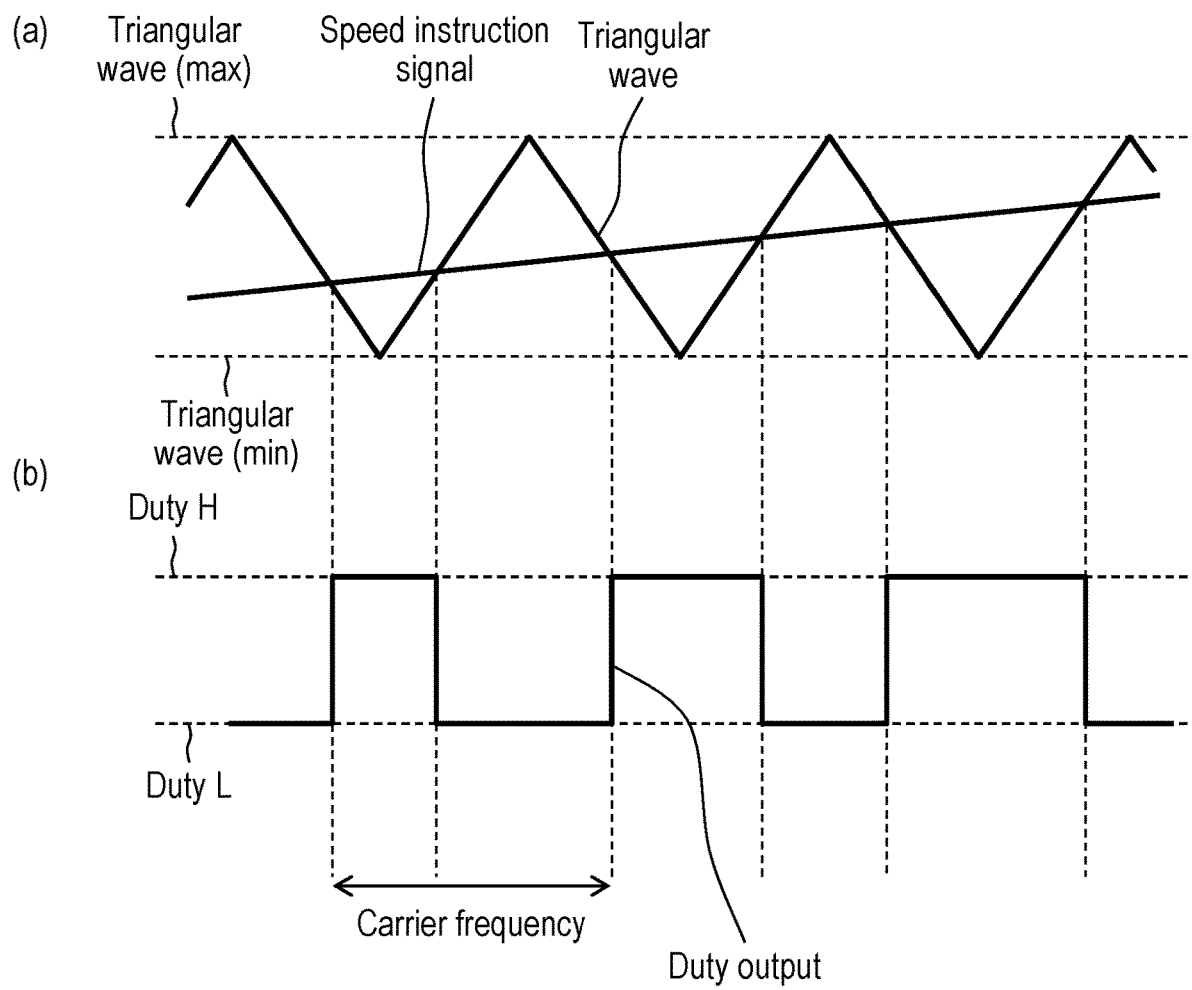
FIG. 5 illustrates a relationship between a speed instruction signal and a duty in the duty determination unit according to the present disclosure.

FIG. 5 illustrates a relationship between a speed instruction signal and a duty in duty determination unit 12 according to the present embodiment. FIG. 5(a) illustrates a triangular wave generated in a triangular wave generating circuit and a speed instruction signal inputted from speed instruction unit 13. FIG. 5(b) illustrates a duty determined by comparison of FIG. 5(a) by using a comparator.

The triangular wave generating circuit constituting duty determination unit 12 includes a charge-and-discharge circuit including a resistance and a capacitor, and is set so as to oscillate at a predetermined carrier frequency. In many cases, the carrier frequency is commonly set, for example, at 16 kHz or higher, that is, in an audible range or higher. As illustrated in FIG. 5(a), a triangular wave generated in the triangular wave generating circuit and a speed instruction signal inputted from speed instruction unit 13 to duty determination unit 12 are inputted to the comparator. The comparator compares the triangular wave and the speed instruction signal and reverses them to produce a duty (duty output pulse) illustrated in FIG. 5(b). As illustrated in FIG. 5, when a value of the triangular wave is larger than a value of the speed instruction signal, a comparator produces duty L, and in contrast, when a value of the triangular wave is smaller than a value of the speed instruction signal, a comparator produces duty H. The produced duties are outputted to drive controller 14.

Drive controller 14 synthesizes the duty inputted from duty determination unit 12 and an output pattern inputted from position detector 7, and distributes and outputs a duty signal to the inverter circuit. Drive controller 14 applies a PWM waveform voltage having a peak value of approximately 140 V corresponding to the duty and to windings U, V, and W via inverter circuit 11. Thus, windings U, V, and W attain a rotating magnetic field to rotate magnet rotor 6.

Here, when a voltage serving as a speed instruction signal is not larger than the minimum triangular wave, an on-duty is zero. In contrast, when a voltage serving as a speed instruction signal is not smaller than the maximum triangular wave, an on-duty reaches the maximum. In other words, when an on-duty is zero, no voltage is applied to the windings of stator 5, and accordingly magnet rotor 6 is stopped. In other words, brushless DC motor 2 is stopped. Note that the duty output includes, for example, voltages "H" and "L" in a binary fashion as illustrated in FIG. 5. Duty H indicates an on-time of a PWM waveform voltage, and duty L indicates an off-time thereof. The maximum triangular wave and the minimum triangular wave represent thresholds of the maximum and the minimum of a speed instruction signal, respectively.

Figure 6:
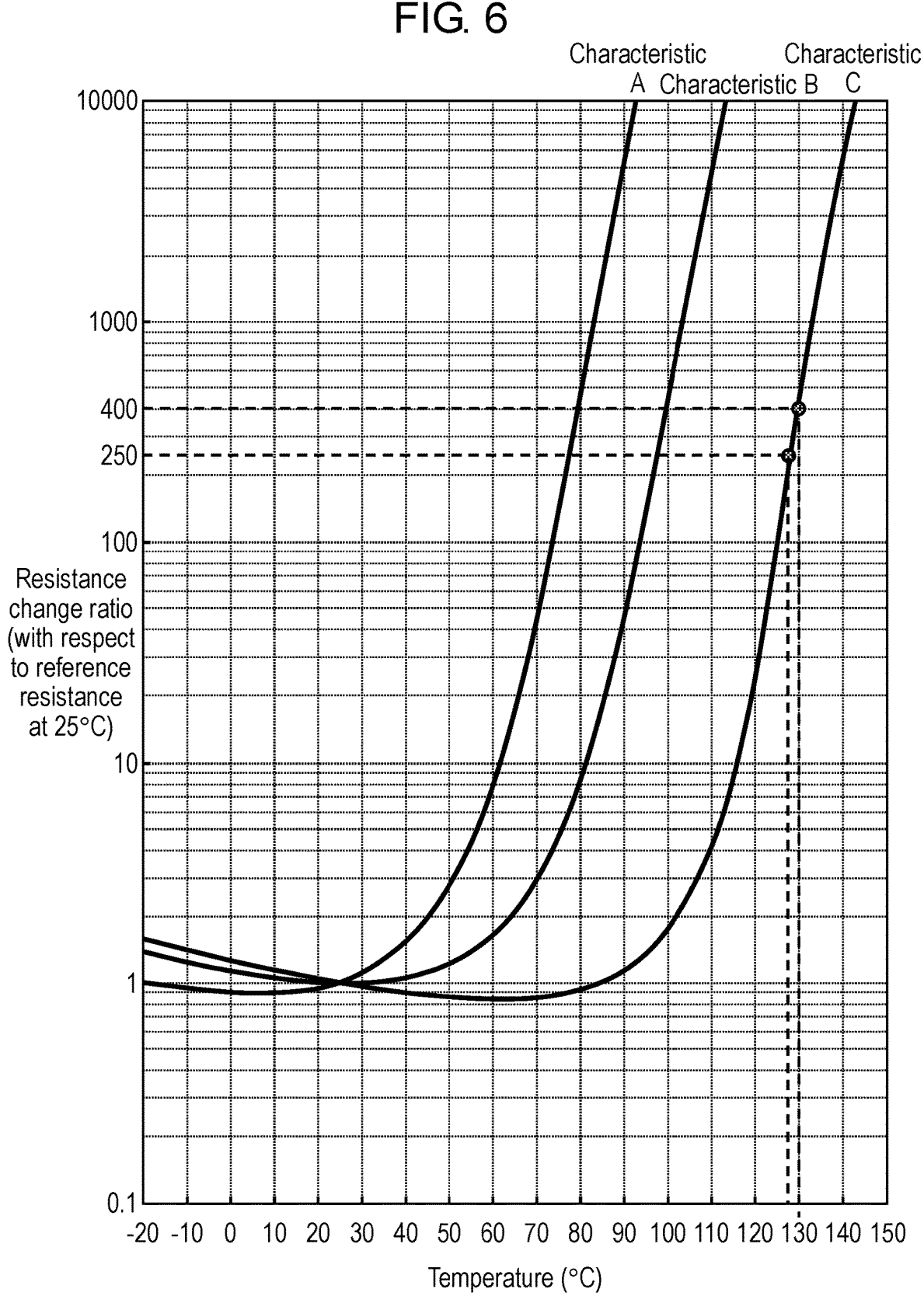
FIG. 6 illustrates characteristics of the temperature-sensitive resistance elements according to the present disclosure.

FIG. 6 illustrates characteristics of temperature-sensitive resistance elements 15 according to the present embodiment. In the present embodiment, a positive temperature coefficient thermistor (PTC) is used as temperature-sensitive resistance element 15. In FIG. 6, the vertical axis indicates the ratio of change in the resistance of temperature-sensitive resistance element 15 with respect to a reference resistance at 25° C., and the horizontal axis indicates the temperature of temperature-sensitive resistance element 15. PTC has properties such that resistance is kept approximately constant in a range from room temperature (25° C.) to a certain temperature, but, resistance rapidly increases when a temperature goes beyond the certain temperature. For example, in the case of characteristic C, assuming that resistance at 25° C. is 1 kΩ, the resistance rapidly increases in value when the temperature exceeds approximately 80° C. At approximately 130° C., the resistance increases in value by approximately 400 times, that is, increases in value to approximately 400 kΩ.

Figure 7:
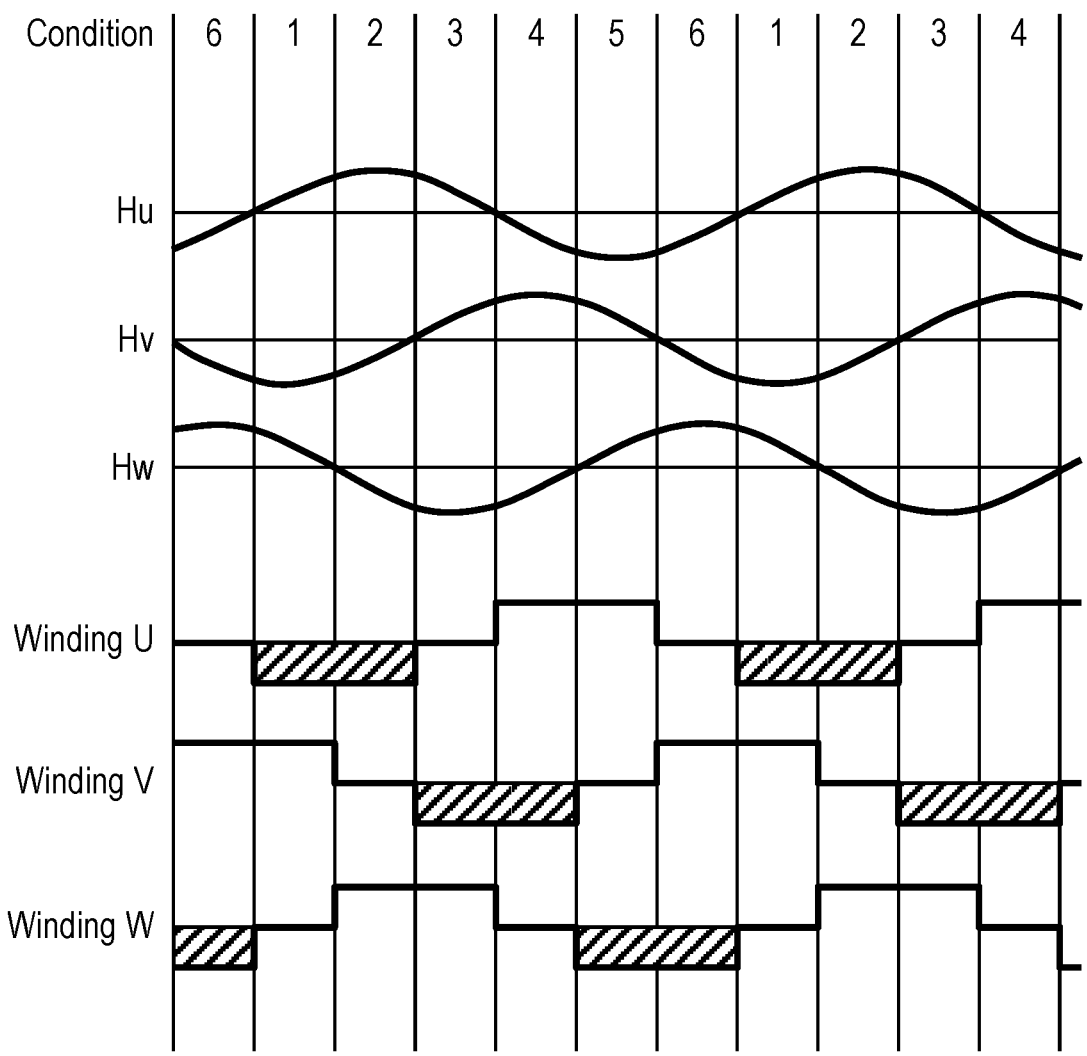
FIG. 7 is a driving timing chart of the brushless DC motor according to the present disclosure.

FIG. 7 is a driving timing chart of brushless DC motor 2 according to the present embodiment. FIG. 7 illustrates, as an example, a timing chart of three-phase full-wave 120-degree energization. Here, outputs corresponding to windings U, V, and W of hole elements serving as position detectors 7 are assumed to be outputs Hu, Hv, and Hw, respectively. Output Hu represents + (plus) output with respect to − (minus) output of the hole element corresponding to winding U, and output on the + side with respect to the middle point of amplitude is "H" and output on the – side with respect to the middle point of amplitude is "L". Outputs Hu, Hv, and Hw of the hole element in condition 1 to condition 6 in FIG. 7 are arranged so as to have a phase difference of an electrical angle of 120 degrees from each other. Here, for example, in condition 1, hole element outputs (Hu, Hv, Hw)=(H, L, H). In this case, drive controller 14 distributes and outputs a duty signal to inverter circuit 11 so as to pass current through windings U, V, and W of stator 5 in a direction from winding V to winding U. Specifically, drive controller 14 distributes and outputs a duty signal to inverter circuit 11 so as to satisfy switching elements (Q1, Q2, Q3, Q4, Q5, Q6)=(OFF, ON, OFF, PWM, OFF, OFF). Here, "PWM" means that, using a PMW waveform voltage of a duty produced by duty determination unit 12, an average voltage applied to windings U, V, and W is increased or decreased to change the number of revolutions of brushless DC motor 2. In other words, by controlling a duty of a switching element expressed as "PWM" in FIG. 7, an average voltage applied to windings U, V, and W is increased or decreased to change the number of revolutions of brushless DC motor 2.

Figure 8:
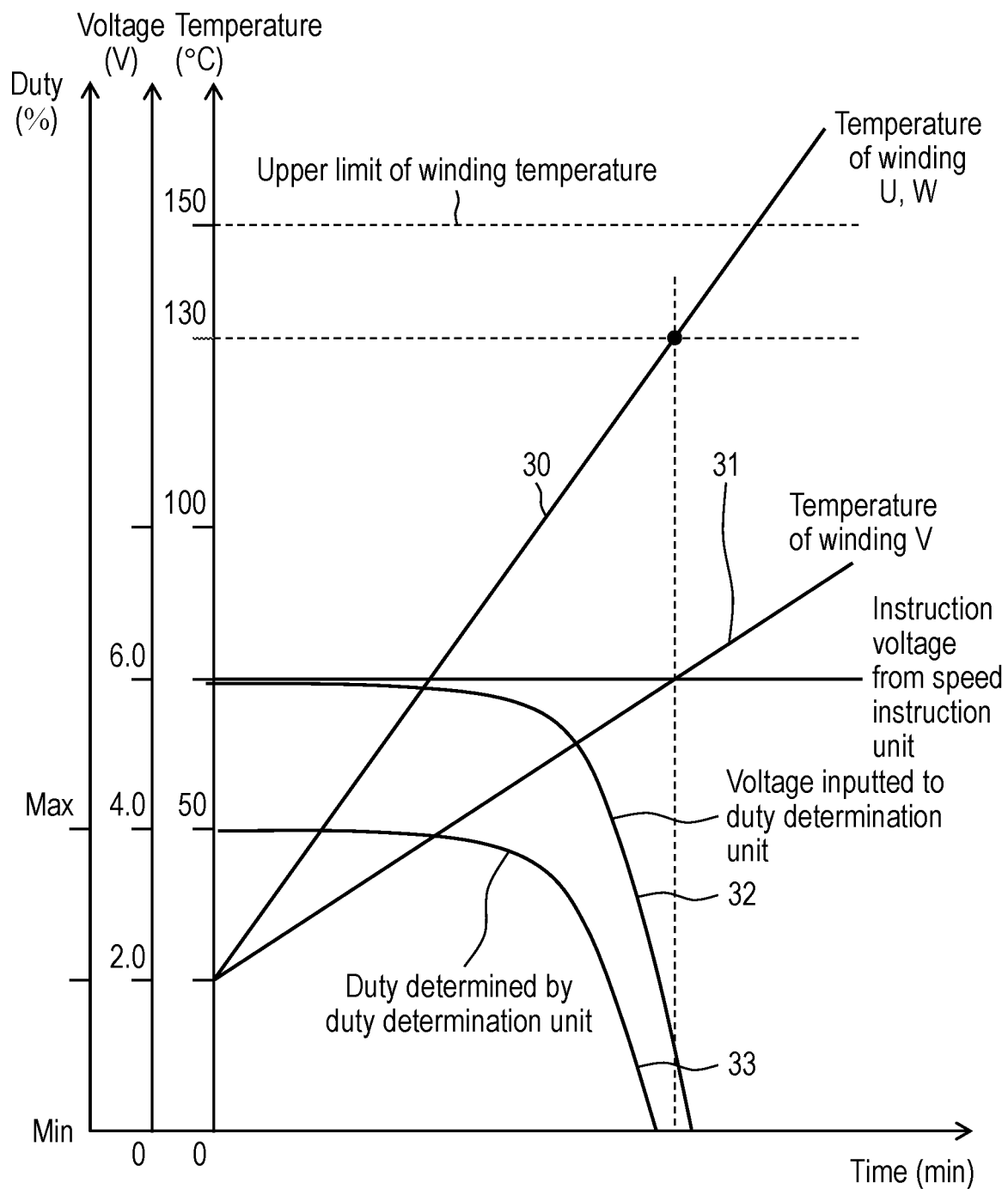
FIG. 8 illustrates a relationship between temperatures of windings and a speed instruction signal according to the present disclosure.
Figure 9:
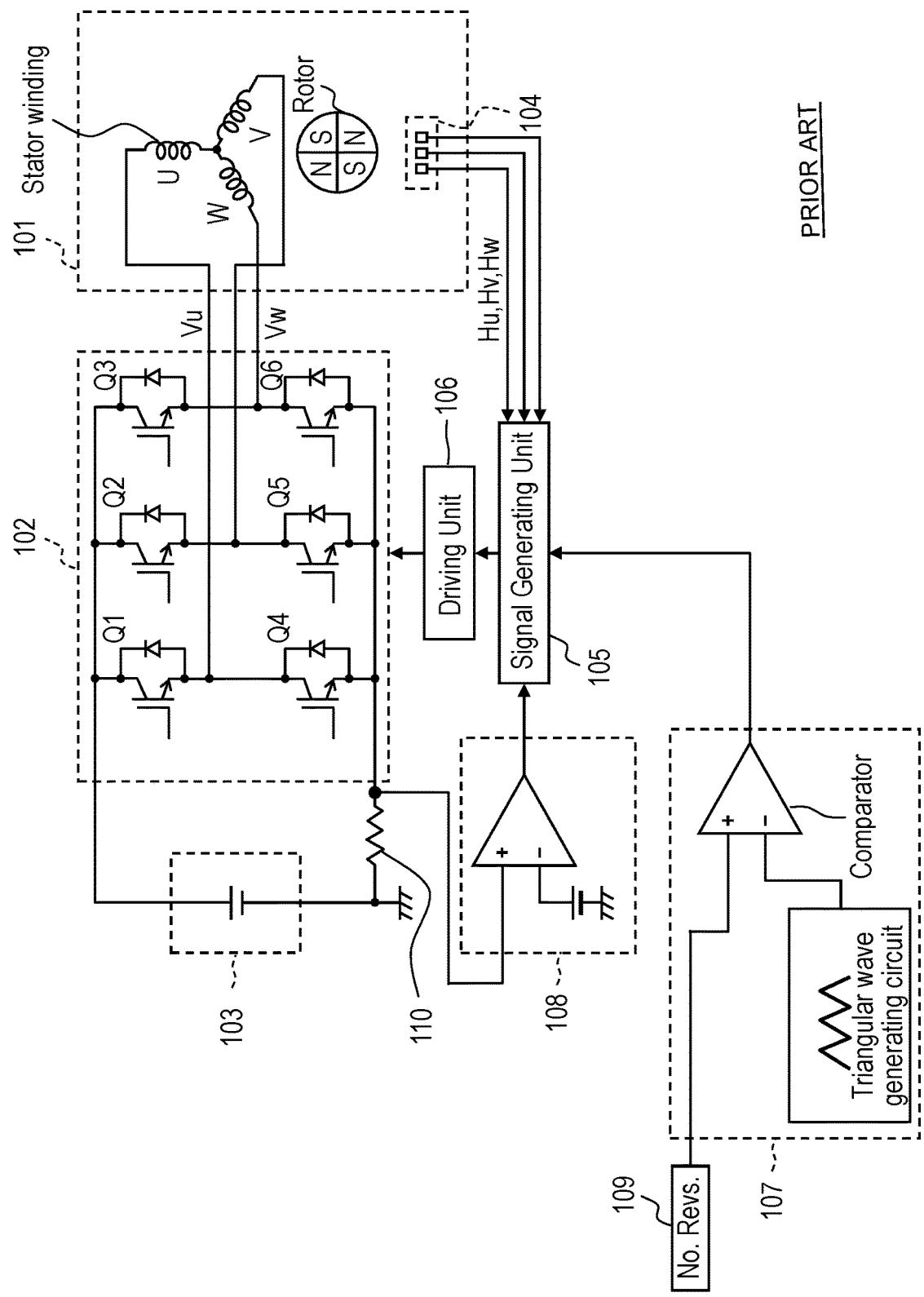
FIG. 9 is a block diagram illustrating functions of a conventional brushless DC motor.
Figure 10:
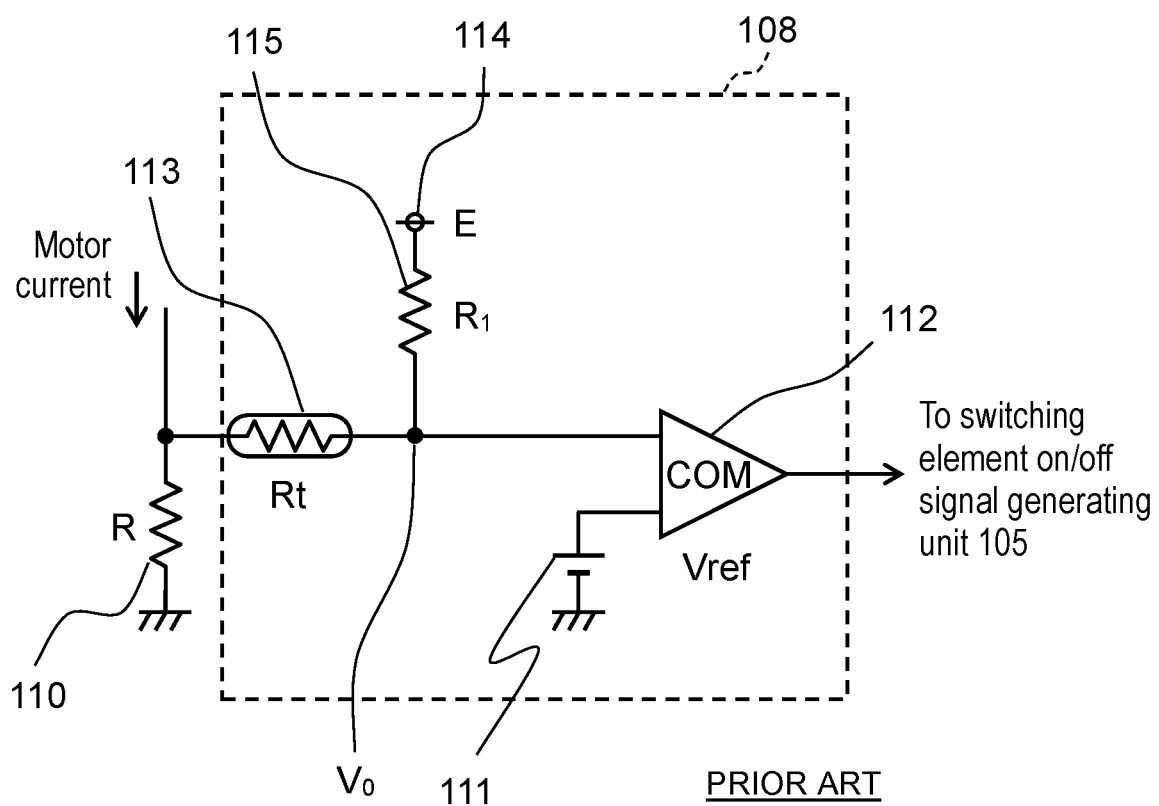
FIG. 10 is a schematic circuit diagram of a conventional overcurrent detector.

FIG. 8 illustrates a relationship between temperatures of windings U, V, and W and a speed instruction signal according to the present embodiment. An operation performed when an abnormality, such as rotational abnormality or locking, occurs in brushless DC motor 2 is now described.

The upper limit of the temperatures of windings U, V, and W is defined by dielectric-breakdown temperatures of the coatings of windings U, V, and W, or in standards, for example. In the present embodiment, the upper limit is 150° C., for example.

The voltage as the speed instruction signal outputted from speed instruction unit 13 is designed such that a voltage at the time when the duty determined by duty determination unit 12 reaches the maximum leads to a condition in which the temperatures of windings U, V, and W are highly likely to be the highest. In the present embodiment, for example, duty max=5.8 V, and the output of speed instruction unit 13, namely, Vo=6 V. Furthermore, a voltage at the time when a duty reaches the minimum is that duty min=2.0 V.

As described with reference to FIG. 5, in duty determination unit 12, a voltage as a speed instruction signal is inputted to the comparator. At this time, the comparator has a high input impedance, and accordingly, current Iin flowing through a speed instruction signal input section of the comparator is considerably small, namely, approximately 25 μA.

As described about FIG. 7, in three-phase full-wave driving, two of three-phase windings U, V, and W are always energized. For example, at a certain moment during the driving of brushless DC motor 2, current flows from winding U to winding W.

In the present embodiment, a case in which brushless DC motor 2 is locked when current is flowing from winding U to winding W will be described. The temperatures of windings U and W rise as shown by plot 30 in FIG. 8. Here, the temperature of winding V having not been energized gradually rises in response to the rise in the temperatures of windings U and W, as shown by plot 31.

As illustrated in FIG. 4, temperature-sensitive resistance elements 15 correspond to different windings U and V, respectively. Temperature-sensitive resistance element 15*a* is arranged for winding U, and temperature-sensitive resistance element 15*b* is arranged for winding V. Temperature-sensitive resistance elements 15*a* and 15*b* are connected in series to each other, as described above.

Here, assuming that temperature-sensitive resistance element 15*a* has characteristic C shown in FIG. 6, for example, resistance at 25° C. is 1 kΩ. According to the characteristic shown in FIG. 6, the resistance of temperature-sensitive resistance element 15*a* at 130° C. is 400 kΩ which is approximately 400 times as high as the resistance at 25° C. A voltage as a speed instruction signal outputted from speed instruction unit 13 is inputted to duty determination unit 12 via temperature-sensitive resistance elements 15*a* and 15*b*. Here, resin 22 is filled between winding U and temperature-sensitive resistance element 15*a*, and accordingly, thermal resistance is present there. Therefore, a difference in temperature arises between temperature-sensitive resistance element 15*a* and winding U. In the present embodiment, this difference in temperature is assumed as 2° C. to 3° C. In this case, for example, when the temperatures of windings U and W are 130° C., the temperature of temperature-sensitive resistance element 15*a* is 127° C. to 128° C. As illustrated in FIG. 6, resistance at the time when the temperature of temperature-sensitive resistance element 15*a* is 127° C. to 128° C. is approximately 250 kΩ, which is approximately 250 times as high as the resistance value at 25° C. In the following description, for simplification, the resistance of temperature-sensitive resistance element 15*a* is assumed as 200 kΩ.

Here, the resistance of temperature-sensitive resistance elements 15*a* and 15*b* at a certain temperature are referred to as Rt(a) and Rt(b), respectively. In addition, a voltage inputted to duty determination unit 12 is referred to as voltage Vin. Voltage Vin is expressed by the following formula.

$$Vin = Vo - Iin \times (Rt(a) + Rt(b)) \quad \text{(Formula 1)}$$

Here, temperature-sensitive resistance elements 15*a* and 15*b* are arranged so as to correspond to different two phase windings, for example, windings U and V, respectively. Therefore, under a rotational abnormality, for example in a state in which brushless DC motor 2 is locked during the passage of current from winding U to winding W, voltage Vin is expressed by the following formula.

$$Vin \leq Vo - Iin \times Rt(a) \quad \text{(Formula 2)}$$

Here, when temperature-sensitive resistance element 15*a* having characteristic C is selected, a voltage inputted to duty determination unit 12 rapidly decreases as illustrated in plot 32 in respect to a rise in the temperature of winding U. In other words, a duty determined by duty determination unit 12 rapidly decreases as illustrated in plot 33, and accordingly, the off-time of a PWM waveform increases. In the case where winding U is at 130° C., Formula 2 is expressed as follows.

$$Vin \leq 6\ V - 25\ \mu A \times 200\ k\Omega \quad \text{(Formula 3)}$$

That is, the input voltage of duty determination unit 12 is that Vin≤1 V. Voltage Vin is lower than duty Min, namely, 2V, and hence, a duty determined by duty determination unit 12 is zero. Thus, no voltage is applied to windings U and W, and accordingly, a rise in the temperatures of windings U and W is substantially prevented. In other words, by appropriately setting the characteristic of temperature-sensitive resistance element 15 and a duty determined by duty determination unit 12, even when an abnormality occurs and the temperature of a winding rises, a temperature rise can be substantially prevented before the temperature of the winding exceeds the upper limit thereof.

As described above, temperature-sensitive resistance elements 15 perform the function of reducing a value (duty)

determined by duty determination unit 12 in response to a rise in the temperatures of windings 16. Furthermore, one of temperature-sensitive resistance elements 15, namely, temperature-sensitive resistance element 15a performs the above-described function to reduce the range of the temperature rise in windings 16 in the event of a rotational abnormality to a predetermined tolerable temperature range or lower. Thus, a rise in the temperatures of windings 16 can be substantially prevented.

Note that an example was provided here in which a duty determined by duty determination unit 12 is zero. Actually, in many cases, due to the thermal resistance of brushless DC motor 2 itself, ambient temperature, or other reasons, a temperature rise is substantially prevented in a state where a duty has been outputted, so that the temperatures of windings 16 do not exceed the upper limit thereof, and thermal balance is acquired.

Furthermore, since each of temperature-sensitive resistance elements 15 is arranged for a corresponding one of different windings 16, the temperatures of windings 16 can be substantially prevented in any state in the event of a rotational abnormality such as locking or overloading so as not to exceed the upper limit of temperature rise of windings 16. In the present embodiment, temperature-sensitive resistance elements 15 are arranged for windings U and V out of windings U, V, and W. With this configuration, even when an abnormality occurs in any condition illustrated in FIG. 7 and the temperatures of windings 16 rise, the abnormality can be detected and a rise in the temperatures of windings 16 can be substantially prevented.

Note that, in the present embodiment, resin 22 is filled between temperature-sensitive resistance elements 15 and windings 16 of stator 5, but an air layer without resin may be present therebetween, or a material having good heat conductivity, for example, heat radiating silicone, may be partially applied therebetween. Furthermore, in the present embodiment, three-phase full-wave 120-degree energization is employed as a driving system, but wide angle (150-degree) energization or sinusoidal-wave energization may be employed, and there is no difference in operational effects between these driving systems. Furthermore, in the present embodiment, a voltage to be applied to inverter circuit 11 is a DC voltage of approximately 140 V obtained by full wave rectification from AC power supply 8, but may be a low DC voltage of 24 V or 42 V.

INDUSTRIAL APPLICABILITY

The brushless DC motor according to the present disclosure can substantially prevent a rise in the temperature of a stator winding without a special temperature determination unit, and thus has higher reliability and is capable of achieving cost reduction and downsizing. Therefore, the brushless DC motor is useful as a brushless DC motor to be used for ventilating air blowers, such as a ventilation fan, a range hood fan, and an air cleaner.

REFERENCE MARKS IN THE DRAWINGS

1 . . . casing
2, 101 . . . brushless DC motor
3 . . . air blowing fan
4 . . . external circuit
5 . . . stator
6 . . . magnet rotor
7 . . . position detector
8 . . . AC power supply
9 . . . rectifier
10 . . . smoothing capacitor
11 . . . inverter circuit
12 . . . duty determination unit
13 . . . speed instruction unit
14 . . . drive controller
15, 15a, 15b, 113 . . . temperature-sensitive resistance element
16, U, V, W . . . winding
17 . . . permanent magnet
18 . . . ball bearing
19 . . . monolithic IC
20 . . . connector
21 . . . printed circuit board
2 . . . resin
23 . . . bracket
24 . . . insulator

The invention claimed is:

1. A brushless DC motor, comprising:
a stator around which three-phase windings are wound;
a magnet rotor configured to rotate by a power supply to the stator;
an inverter circuit including a plurality of switching elements and connected to the stator;
a position detector configured to detect a positional relationship between the magnet rotor and the windings;
a speed instruction unit configured to output, as a speed instruction signal, a voltage corresponding to a rotation speed of the magnet rotor;
a duty determination unit configured to determine a duty of a voltage applied to the stator, based on the speed instruction signal from the speed instruction unit;
a drive controller configured to distribute and output a duty signal to the plurality of switching elements of the inverter circuit, based on the positional relationship detected by the position detector and the duty determined by the duty determination unit; and
temperature sensitive resistance elements in an electrical path between the speed instruction unit and the determination unit and configured to detect a temperature of the windings and, by increasing a resistance in response to a temperature rise, reduce the voltage given as the speed instruction signal from the speed instruction unit to the duty determination unit.

2. The brushless DC motor according to claim 1, wherein the temperature-sensitive resistance elements are
each provided to a corresponding one of different two of the three-phase windings, and
connected in series to each other on a wire connection between the speed instruction unit and the duty determination unit.

3. The brushless DC motor according to claim 1, wherein the temperature-sensitive resistance elements are configured
to perform a function of reducing the duty determined by the duty determination unit in response to a rise in temperatures of the windings in an event of an abnormality, and
by increasing a resistance of at least one of the temperature-sensitive resistance elements in response to the rise in temperature in the event of the abnormality,
to reduce the duty determined by the duty determination unit so as to make a range of the rise in the temperatures of the windings in the event of the abnormality equal to or lower than a predetermined tolerable temperature range.

4. The brushless DC motor according to claim 1, wherein the temperature-sensitive resistance elements are provided on a surface of a printed circuit board provided so as to face the stator, the surface facing the stator.

5. The brushless DC motor according to claim 3, wherein the event of the abnormality is an event of locking of or overloading on the brushless DC motor.

6. The brushless DC motor according to claim 1, further comprising resin in contact with the windings and the temperature-sensitive resistance elements.

7. The brushless DC motor according to claim 1, wherein an amount of change in the voltage given as the speed instruction signal from room temperature to a first temperature is different from an amount of change in the voltage given as the speed instruction signal from the first temperature to a second temperature.

* * * * *